Jan. 2, 1968  B. H. GWYNN ET AL  3,361,829
PROCESS FOR DECOBALTING HYDROFORMYLATION REACTION MIXTURES
Filed Nov. 18, 1963
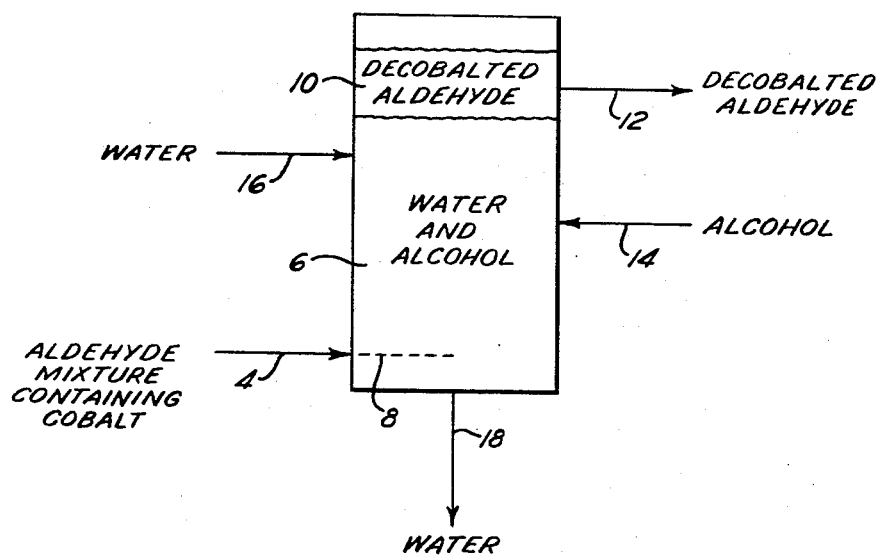
INVENTORS.
BERNARD H. GWYNN
EDMOND R. TUCCI
BY
ATTORNEY.

൧

3,361,829
PROCESS FOR DECOBALTING HYDROFORMYLA-
TION REACTION MIXTURES
Bernard H. Gwynn, Gibsonia, and Edmond R. Tucci,
Pittsburgh, Pa., assignors to Gulf Research & Development Company, Pittsburgh, Pa., a corporation of Delaware
Filed Nov. 18, 1963, Ser. No. 324,524
14 Claims. (Cl. 260—604)

ABSTRACT OF THE DISCLOSURE

A process for decobalting a hydroformylation reaction mixture containing an aldehyde, an alcohol and cobalt which involves treating such mixture with a straight chain alkanol having at least one less carbon than the alcohol in the mixture but having from one to five carbon atoms, such as methanol.

---

This invention relates to process for removing a metal impurity from an organic mixture, particularly a hydroformylation reaction product.

Olefins having from two to 20 carbon atoms can be reacted in accordance with the well-known Oxo process with approximately stoichiometric amounts of hydrogen and carbon monoxide in the presence of about 0.5 to about 1.5 percent by weight, based on the reaction mixture, of a catalyst which can be a cobalt salt, such as cobalt napthenate or the cobalt salt of higher aliphatic acids, such as 2-ethyl hexanoic, lauric, palmitic and stearic acids, at a temperature of about 300° to about 400° F. and a pressure of about 2000 to about 4000 pounds per square inch for about 15 to about 35 minutes to obtain a reaction mixture predominating in an aldehyde having one carbon more than said olefin but also containing unreacted hydrogen, carbon monoxide and olefin. Additionally the reaction mixture contains dissolved therein the cobalt catalyst in the form of cobalt carbonyls, such as dicobalt octacarbonyl, cobalt hydrocarbonyl and cobalt tricarbonyl, as well as a small amount of alcohol which has been formed under the conditions noted as a result of the conversion of some of the aldehyde produced in the process.

Generally the reaction mixture is subected to further processing, preferably by conversion of the aldehyde to the corresponding alcohol by hydrogenation in the presence of a nickel catalyst. Before this is done, however, the unreacted hydrogen, carbon monoxide and/or olefin are first removed from the reaction mixture by any convenient means. Since the cobalt carbonyls are generally detrimental in further processing of the aldehyde mixture, for example in the hydrogenation of the aldehyde the cobalt carbonyls will decompose and the cobalt metal will deposit and therefore deactivate the hydrogenation catalyst, it must also be removed therefrom.

We have discovered that the cobalt catalyst can be removed from an Oxo product as described above by the mere expedient of contacting the same with an aqueous alcoholic solution containing an alcohol having from one to five carbon atoms, preferably one to four carbon atoms.

As noted above, the hydroformylation reaction product, even after removal of unreacted hydrogen, carbon monoxide and/or olefin therefrom, will contain largely an aldehyde having one more carbon than the unreacted olefin, but also from about 0.2 to about 0.6 percent by weight of cobalt carbonyls and from about two to 20 percent by weight of alcohol corresponding to said aldehyde, each of said amounts being relative to said aldehyde. The alcohol in this mixture has a tendency to react with the dicobalt octacarbonyl, which is predominantly formed under decobalting conditions, to form a dicobalt octacarbonyl-alcohol complex of the type

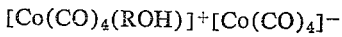

At a temperature above about 75°, preferably from about 100° to about 125° F., and a pressure of at least about 15, preferably from about 15 to 150 pounds per square inch gauge the complex will tend to decompose to form cobalt ions, carbon monoxide and free alcohol. At a temperature below about 75° F., preferably from about 74° to about —20° F. and a pressure of about 15 to about 4000 pounds per square inch gauge, however, the complex is relatively stable and will therefore not decompose.

The ease of formation of the defined dicobalt octacarbonyl-alcohol complex depends on the length of the alcohol chain in the hydroformylation reaction mixture as well as the degree of branching thereof. Thus, low molecular weight straight chain alcohols having from one to five carbon atoms, such as methanol, ethanol, 1-propanol, etc., appear to form the defined complex with the dicobalt octacarbonyl more readily than longer chain alcohols, such as 1-octanol, 1-decanol, etc. Primary alcohols, such as methanol, ethanol, 1-propanol, 1-butanol, 1-hexanol, 1-decanol, etc., appear to form the defined complex more readily than the secondary alcohols, such as 2-propanol, 2-butanol, 2-pentanol, 2-hexanol, etc. Tertiary alcohols, such as tertiary-butanol, amyldimethyl carbinol, butylethylmethyl carbinol, etc., exhibit the least tendency to form the defined complex.

Treatment of the hydroformylation reaction mixture defined above with water for removal of the dicobalt octacarbonyl gives rise to several problems. When this mixture is contacted with water at room temperature (75° F.), several reactions can occur. First, the water may react with the dicobalt octacarbonyl that has not already reacted with the alcohol to produce the defined dicobalt octacarbonyl-alcohol complex to form the dicobalt octacarbonyl-water complex

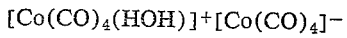

Secondly, since the dicobalt octacarbonyl-alcohol complex is also present, in some cases, it is also possible for an exchange reaction to occur which involves displacement of the alcohol from dicobalt octacarbonyl-alcohol complex $[Co(CO)_4(ROH)]^+[Co(CO)_4]^-$, to form the corresponding dicobalt octacarbonyl-water complex

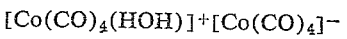

The limitation placed upon this exchange reaction is that the alcohol complex must be reasonably soluble in water for displacement of the alcohol to occur. Thus, it is possible to interchange straight chain alcohol complexes having from one to five carbon atoms, such as methanol, ethanol, 1-propanol and 1-butanol complexes quite readily with water, the interchange being easiest with methanol and increasing somewhat in difficulty with increasing carbon number. However, starting with the 1-pentanol complex, the solubility of the dicobalt octacarbonyl-alcohol complex in water decreases and as the carbon number of the alcohol increases the solubility of the dicobalt octacarbonyl-alcohol complex in water becomes increasingly difficult and by the time the number of carbon atoms in the alcohol complex reaches $C_6$, the solubility of the dicobalt octacarbonyl-alcohol complex in water is very low. Accordingly, mere water extraction of a hydroformylation reaction mixture at room temperature for removal of dicobalt octacarbonyl therefrom is somewhat effective for mixtures containing $C_3$, $C_4$ and, to a lesser extent, $C_5$ aldehydes, and is almost completely ineffective for higher aldehydes.

As noted above, the dicobalt octacarbonyl-alcohol complex in the hydroformylation reaction mixture is exchanged with water in proportion to its solubility in water. The solubility decreases as the number of carbon atoms in the alcohol in the complex increases and becomes negligible when the alcohol has six carbon atoms or more. We have found that we can bring about the desired solubility, and thereby effectively remove dicobalt octacarbonyl from a hydroformylation reaction mixture regardless of the number of carbon atoms of the aldehyde or alcohol in the hydroformylation reaction mixture, by contacting such mixture with a defined amount of a water soluble alcohol having from one to five carbon atoms, such as methanol, ethanol, 1-propanol, 1-butanol and 1-pentanol. Of these methanol, ethanol and 1-propanol are preferred. The best alcohol to use in the circumstances is methanol, however, since it readily complexes with any of the alcohols present in the hydroformylation reaction mixture and the complex thus formed is the most water-soluble complex of all. In any event, effective decobalting, in accordance with the teaching of this invention, is obtained by employing an alcohol therefor having a carbon number less than the carbon number of the alcohol in the hydroformylation reaction mixture to be treated. If the alcohol used for decobalting has the same number of carbon atoms as the alcohol in the hydroformylation reaction mixture to be treated, interchange could occur but the treatment would be ineffective. If the alcohol employed has a higher carbon number than the alcohol present in the hydroformylation reaction mixture, and even if interchange were to take place, the complex so formed would be less soluble in water than the original complex formed between the cobalt carbonyl and the alcohol in the hydroformylation reaction mixture.

As an example, if a solution of water and methanol is brought into contact with an aldehyde product containing isooctyl aldehyde, the corresponding alcohol and dicobalt octacarbonyl, the methanol enters the organic phase, reacts with free dicobalt octacarbonyl to form

$[Co(CO)_4(CH_3OH)]^+[Co(CO)_4]^-$ and also displaces $C_8$ alcohol from

$[Co(CO_4)(C_8H_{17}OH)]^+[Co(CO)_4]^-$ to form the methanol complex. This methanol complex being in equilibrium with the aqueous phase enters the same where it may exchange with water to form

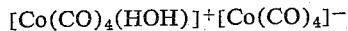
$[Co(CO)_4(HOH)]^+[Co(CO)_4]^-$ and thereby again provide methanol to react in the organic phase, or it may, provided the temperature is below about 75° F., preferably between about 74° to about —20° F. and the pressure between about 15 to about 4000 pounds per square inch gauge, remain as the methanol complex in the aqueous phase. In the event the temperature is maintained above about 75° F., preferably between about 100° to about 125° F. and the pressure between about 15 to about 150 pounds per square inch gauge, the resultant methanol complex will decompose, with the result that methanol, carbon monoxide and water-soluble cobalt ions will be formed. Methanol has been used above merely for illustration, and almost comparable results will also be obtained when ethanol, 1-propanol, 1-butanol and 1-pentanol is substituted therefor.

The amount of alcohol required for decobalting is critical and must be approximately in stoichiometric amounts sufficient to react with and form a complex with the dicobalt octacarbonyl in the hydroformylation reaction mixture. Obviously amounts of added alcohol much below the stoichiometric amounts sufficient to react with the dicobalt octacarbonyl-alcohol complex originally present in the hydroformylation reaction mixture will not be sufficient to convert the complex to the more desirable water soluble form. However, when the alcohol is added to the system in amounts greatly in excess of the stoichiometric amounts required, the complex which has formed as a result of the desired interchange has a tendency to dissolve in the excess alcohol. The excess alcohol, in turn, has a tendency to dissolve in the aldehyde phase. For such reason, a portion of the cobalt complex that has been formed and is in the aqueous phase will be returned to the aldehyde phase where it will remain. In this case effective decobalting will not take place. Accordingly, the amount of alcohol added to the system for decobalting, or must be present in the system, must be from about 0.5 to about 3.0, preferably from about 1.5 to about 2.0, percent by weight, based upon the aldehyde.

A preferred embodiment of our invention comprises a continuous operation and is illustrated in the accompanying drawing which is hereby incorporated in and made part of the present specification.

Referring to the drawing an aldehyde mixture obtained by reacting approximately stoichiometric amounts of an olefin, hydrogen and carbon monoxide in the manner defined hereinabove, and from which unreacted hydrogen and carbon monoxide have been removed, enters decobalter 2 by line 4. Located within decobalter 2 is water 6 containing from about 0.5 to about 3.0 percent by weight, based on the aldehyde, of the defined $C_1$ to $C_5$ alcohol having one carbon more than the aldehyde in the hydroformylation reaction product. The portion of line 4 within the decobalter is provided with suitable orifices 8 so that when the hydroformylation reaction product is introduced therein it is introduced in the form of droplets which then rise upwardly therethrough. As the hydroformylation reaction product rises upwardly through the water the defined interchanges take place, and the cobalt carbonyls find themselves in the aqueous layer 6 and the decobalted hydroformylation reaction product, within a period which can be from about 5.0 to about 10.0 minutes, which is sufficient for decobalting in the process defined herein, finds itself in product layer 10 from which it is removed by line 12 for further processing as desired.

In the event the temperature in the reactor 6 is maintained below 75° F., preferably within a range of about 74° to about —20° F. and the pressure within a range of about 15 to about 4000 pounds per square inch gauge, the resultant dicobalt octacarbonyl-alcohol or water complex will not decompose but remain in the aqueous layer 6. In such case, additional alcohol sufficient to maintain the desired alcohol concentration in aqueous layer 6 is introduced into the system by line 14. If, however, the temperature is maintained above 75° F., preferably within a range of about 100° to about 125° F. and the pressure within a range of about 15 to about 150 pounds per square inch gauge, the resultant dicobalt octacarbonyl-alcohol complex will be decomposed to form cobalt ions soluble in the aqueous medium, carbon monoxide which will leave the reaction zone with the product in line 12, and alcohol will be regenerated. In such case additional alcohol only in the amount sufficient to replace any alcohol that might leave the system, for example by way of line 12, need be added to the system by line 14. If desired additional water can be introduced into the system by line 16 and water removed by line 18.

The following further illustrates the invention described and claimed herein.

*Example I*

An apparatus similar to that illustrated in the accompanying drawing was employed in a continuous operation. Heptene-1 was reacted with approximately stoichiometric amounts of hydrogen and carbon monoxide in the presence of about 0.6 percent by weight of the cobalt salt of 2-ethylhexanoic acid, based on the reaction mixture, at a temperature of 300° F. and a pressure of 3500 pounds per square inch gauge over a period of 20 minutes to obtain a hydroformylation reaction mixture containing isooctyl aldehyde, the corresponding alcohol, dissolved cobalt carbonyls and unreacted hydrogen, carbon monoxide and heptene-1. This mixture was treated to remove substantially all of the unreacted components therefrom and resulted in a mixture containing 93 percent by weight of isooctyl aldehyde, 5.0 percent by weight of isooctyl alcohol and 0.0938 milligram of cobalt per milliliter of said mixture. Ten grams per minute of this mixture was introduced into the system by line 4 and the average contact time of the droplets in traversing the aqueous layer was 0.5 minute. The aqueous layer contained 0.45 percent by weight thereof of methanol, or two weight percent based on the aldehyde, and the same was maintained at a temperature of 90° to 100° F. and atmospheric pressure over the period of the run which lasted 10 minutes. It was found after the operation had been stabilized that the aldehyde stream in line 12 contained only 0.0040 milligram of cobalt per milliliter of product.

That the amount of alcohol that must be present in the decobalting system is critical is apparent from an examination of Example II and Table I below.

*Example II*

Propylene was reacted with approximately stoichiometric amounts of hydrogen and carbon monoxide in the presence of about 0.5 percent by weight of the cobalt salt of 2-ethylhexanoic acid, based on the reaction mixture, at a temperature of 300° F. and a pressure of 3500 pounds per square inch gauge over a period of 18 minutes to obtain a hydroformylation reaction mixture containing butyl aldehyde, butyl alcohol, dissolved cobalt carbonyls and unreacted hydrogen, carbon monoxide and propylene. This mixture was treated to remove the unreacted components therefrom and resulted in a mixture containing 75 percent by weight of the aldehyde, 15 percent by weight of the alcohol and 0.117 milligram of cobalt per milliliter of said mixture. To each of 17 samples of said mixture, amounting to eight grams in each case, there was added 40 grams of water and, except for Sample No. 1, varying amounts of methanol. The mixture resulting from such additions was shaken continuously and maintained at a temperature of 80° F. and a pressure of 15 pounds per square inch gauge over a period of 60 minutes. Each of the samples was then analyzed to determine the amount of cobalt remaining in the treated organic product. The results are tabulated below in Table I.

TABLE I

| Sample Number | Percent by Weight Methanol Added, Based on the Product Treated | Cobalt Remaining in the Treated Organic Product [$Co^{++}$], mg./ml. |
| --- | --- | --- |
| Blank | --- | 0.117 |
| 1 | None | 0.020 |
| 2 | 2 | 0.010 |
| 3 | 4 | 0.029 |
| 4 | 8 | 0.035 |
| 5 | 12 | 0.032 |
| 6 | 16 | 0.015 |
| 7 | 20 | 0.020 |
| 8 | 40 | 0.045 |
| 9 | 60 | 0.061 |
| 10 | 80 | 0.075 |
| 11 | 100 | 0.079 |
| 12 | 120 | 0.083 |
| 13 | 160 | 0.091 |
| 14 | 180 | 0.094 |
| 15 | 200 | 0.087 |
| 16 | 240 | 0.087 |
| 17 | 280 | 0.090 |

From Table I it is apparent that the amount of methanol present in the aqueous solution is critical for effective decobalting. Most effective decobalting was obtained when the amount of methanol present in the aqueous layer was about 0.45 percent by weight thereof, which corresponds to about two percent by weight relative to the aldehyde. Amounts in excess thereof result in less effective decobalting and are not recommended.

Obviously, many modifications and variations of the invention, as hereinabove set forth, can be made without departing from the spirit and scope thereof, and therefore only such limitations should be imposed as are indicated in the appended claims.

We claim:
1. A process for decobalting the product mixture obtained from the hydroformylation of olefins having from to twenty carbon atoms containing an aldehyde, an alcohol and cobalt which comprises mixing such mixture with an aqueous solution containing a straight chain alkanol having at least one less carbon than said first-named alcohol but having from one to five carbon atoms and thereafter separating said product mixture having a reduced cobalt content from the aqueous solution.

2. A process for decobalting the product mixture obtained from the hydroformylation of olefins having from two to twenty carbon atoms containing an aldehyde having from three to 20 carbon atoms, an alcohol having from three to 20 carbon atoms and dissolved cobalt carbonyl which comprises mixing such mixture with an aqueous solution containing a straight chain alkanol having at least one less carbon than said first-named alcohol but having from one to five carbon atoms and thereafter separating said product mixture having a reduced cobalt content from the aqueous solution.

3. A process for decobalting the product mixture obtained from the hydroformylation of olefins having from two to twenty carbon atoms containing an aldehyde having from three to 20 carbon atoms, an alcohol having from three to 20 carbon atoms and dissolved cobalt carbonyl which comprises mixing such mixture with an aqueous solution containing about 0.5 to about three percent by weight of a straight chain alkanol having at least one less carbon than said first-named alcohol but having from one to five carbon atoms and thereafter separating said product mixture having a reduced cobalt content from the aqueous solution.

4. A process for decobalting the product mixture obtained from the hydroformylation of olefins having from two to twenty carbon atoms containing an aldehyde having from three to 20 carbon atoms, an alcohol having from three to 20 carbon atoms and dissolved cobalt carbonyl which comprises mixing such mixture with an aqueous solution of methanol and thereafter separating said product mixture having a reduced cobalt content from the aqueous solution.

5. A process for decobalting the product mixture obtained from the hydroformylation of olefins having from two to twenty carbon atoms containing an aldehyde having from three to 20 carbon atoms, an alcohol having from three to 20 carbon atoms and dissolved cobalt carbonyl which comprises mixing such mixture with an aqueous solution of methanol, the amount of methanol relative to said aldehyde being from about 0.5 to about three percent by weight and thereafter separating said product mixture having a reduced cobalt content from the aqueous solution.

6. A process for decobalting the product mixture obtained from the hydroformylation of olefins having from two to twenty carbon atoms containing an aldehyde having from three to 20 carbon atoms, an alcohol having from three to 20 carbon atoms and dissolved cobalt carbonyl which comprises mixing such mixture with an aqueous solution of methanol, the amount of methanol relative to said aldehyde being from about 0.5 to about three percent by weight, and temperature of said aqueous solution being about 75° to about −20° F. and thereafter separating said product mixture having a reduced cobalt content from the aqueous solution.

7. A process for decobalting the product mixture obtained from the hydroformylation of olefins having from two to twenty carbon atoms containing an aldehyde having from three to 20 carbon atoms, an alcohol having from three to 20 carbon atoms and dissolved cobalt carbonyl which comprises mixing such mixture with an aqueous solution of methanol, the amount of methanol relative to said aldehyde being from about 0.5 to about three percent by weight, and the temperature of said aqueous solution being about 75° to about 125° F. and thereafter separating said product mixture having a reduced cobalt content from the aqueous solution.

8. A process for continuously decobalting the product mixture obtained from the hydroformylation of olefins having from two to twenty carbon atoms containing an aldehyde, and alcohol and cobalt which comprises passing said mixture continuously through an aqueous solution containing a straight chain alkanol having at least one less carbon atom than said first-named alcohol but having from one to five carbon atoms.

9. A process for continuously decobalting the product mixture obtained from the hydroformylation of olefins having from two to twenty carbon atoms containing an aldehyde having from three to 20 carbon atoms, an alcohol having from three to 20 carbon atoms and dissolved cobalt carbonyl which comprises passing said mixture continuously through an aqueous solution containing a straight chain alkanol having at least one less carbon atom than said first-named alcohol but having from one to five carbon atoms.

10. A process for continuously decobalting the product mixture obtained from the hydroformylation of olefins having from two to twenty carbon atoms containing an aldehyde having from three to 20 carbon atoms, an alcohol having from three to 20 carbon atoms and dissolved cobalt carbonyl which comprises passing said mixture continuously through an aqueous solution containing about 0.5 to about three percent by weight of a straight chain alkanol having at least one less carbon atom than said first-named alcohol but having from one to five carbon atoms.

11. A process for continuously decobalting the product mixture obtained from the hydroformylation of olefins having from two to twenty carbon atoms containing an aldehyde having from three to 20 carbon atoms, an alcohol having from three to 20 carbon atoms and dissolved cobalt carbonyl which comprises passing said mixture continuously through an aqueous solution of methanol.

12. A process for continuously decobalting the product mixture obtained from the hydroformylation of olefins having from two to twenty carbon atoms containing an aldehyde having from three to 20 carbon atoms, an alcohol having from three to 20 carbon atoms and dissolved cobalt carbonyl which comprises passing said mixture continuously through an aqueous solution of methanol, the amount of methanol relative to said aldehyde being from about 0.5 to about three percent by weight.

13. A process for continuously decobalting the product mixture obtained from the hydroformylation of olefins having from two to twenty carbon atoms containing an aldehyde having from three to 20 carbon atoms, an alcohol having from three to 20 carbon atoms and dissolved cobalt carbonyl which comprises passing said mixture continuously through an aqueous solution of methanol, the amount of methanol relative to said aldehyde being from about 0.5 to about three percent by weight, and the temperature of said aqueous solution being about 75° to about −20° F.

14. A process for continuously decobalting the product mixture obtained from the hydroformylation of olefins having from two to twenty carbon atoms containing an aldehyde having from three to 20 carbon atoms, an alcohol having from three to 20 carbon atoms and dissolved cobalt carbonyl which comprises passing said mixture continuously through an aqueous solution of methanol, the amount of methanol relative to said aldehyde being from about 0.5 to about three percent by weight, and the temperature of said aqueous solution being about 75° to about 125° F.

No references cited.

LEON ZITVER, *Primary Examiner.*

R. H. LILES, *Assistant Examiner.*